(12) United States Patent
Su et al.

(10) Patent No.: US 11,755,131 B2
(45) Date of Patent: Sep. 12, 2023

(54) FOLDABLE TOUCH SCREEN ELECTRODE STRUCTURE, TOUCH SCREEN AND TOUCH DISPLAY DEVICE

(71) Applicant: Micron Optoelectronics Co., Ltd., Shenzhen (CN)

(72) Inventors: Wei Su, Shenzhen (CN); Zonghe Ye, Shenzhen (CN)

(73) Assignee: Micron Optoelectronics Co., Ltd., Shenzhen (CN)

( * ) Notice: Subject to any disclaimer, the term of this patent is extended or adjusted under 35 U.S.C. 154(b) by 0 days.

(21) Appl. No.: 17/965,988

(22) Filed: Oct. 14, 2022

(65) Prior Publication Data

US 2023/0120045 A1 Apr. 20, 2023

(30) Foreign Application Priority Data

Oct. 14, 2021 (CN) .......................... 202122480524.3

(51) Int. Cl.
*G06F 3/041* (2006.01)

(52) U.S. Cl.
CPC .................................. *G06F 3/0412* (2013.01); *G06F 2203/04102* (2013.01)

(58) Field of Classification Search
CPC ..................... G06F 3/0412; G06F 2203/04102
See application file for complete search history.

(56) References Cited

U.S. PATENT DOCUMENTS

2016/0077347 A1* 3/2016 Yoo et al. ................ G02B 5/26
345/173

* cited by examiner

*Primary Examiner* — Yaron Cohen
(74) *Attorney, Agent, or Firm* — Westbridge IP LLC

(57) ABSTRACT

Disclosed is a foldable touch screen electrode structure, including: a glass substrate including a first sidewall and a second sidewall opposite to each other in a thickness direction of the glass substrate, each of the first sidewall and the second sidewall being provided with an oxide layer; at least two upper adhesive layers and at least two lower adhesive layers; an upper metal grid layer adhered to the first sidewall through the at least two upper adhesive layers; a lower metal grid layer adhered to the second sidewall through the at least two lower adhesive layers; and an upper surface layer connected to an upper metal grid layer, and a lower surface layer connected to a lower metal grid layer; each of the upper surface layer and the lower surface layer includes a rough layer and a low reflection layer which are sequentially stacked.

10 Claims, 4 Drawing Sheets

FOLDABLE TOUCH SCREEN ELECTRODE STRUCTURE, TOUCH SCREEN AND TOUCH DISPLAY DEVICE

CROSS-REFERENCE TO RELATED APPLICATIONS

This application claims priority to Chinese Patent Application No. 202122480524.3, filed on Oct. 14, 2021, and entitled "FOLDABLE TOUCH SCREEN ELECTRODE STRUCTURE, TOUCH SCREEN AND TOUCH DISPLAY DEVICE", the entire contents of which are hereby incorporated by reference.

TECHNICAL FIELD

The present application relates to the technical field of touch screens, in particular to a foldable touch screen electrode structure, a touch screen and a touch display device.

BACKGROUND

In the foldable touch screens, the metal grid touch screens are made by copper plating on the glass substrates, resulting that the adhesive force required for folding cannot be achieved, that is, the adhesive force generated cannot reach the cross-cut test larger than 5B.

SUMMARY

The main purpose of the present application is to provide a foldable touch screen electrode structure, a touch screen and a touch display device, to solve the technical problem of insufficient adhesive force of the metal grid layer on the foldable glass layer in the prior art.

In order to achieve the above purpose, the present application proposes a foldable touch screen electrode structure, which includes:

a foldable touch screen electrode structure, including:
  a glass substrate including a first sidewall and a second sidewall opposite to each other along the thickness direction of the glass substrate, and each of the first sidewall and the second sidewall being provided with an oxide layer;
  at least two upper adhesive layers and at least two lower adhesive layers;
  an upper metal grid layer adhered to the first sidewall through the at least two upper adhesive layers, and a lower metal grid layer adhered to the second sidewall through the at least two lower adhesive layers; and
  an upper surface layer connected to an upper metal grid layer, and a lower surface layer connected to a lower metal grid layer;
  where each of the upper surface layer and the lower surface layer includes a rough layer and a low reflection layer which are sequentially stacked, and the rough layer is disposed close to the upper metal grid layer or the lower metal grid layer.

In one embodiment, the at least two upper adhesive layers and the at least two lower adhesive layers are both metal oxide layers or metal nitride layers, and the metal oxide layers or metal nitride layers are obtained through a reactive sputtering process or a reactive vapor deposition process, a material of a metal target in the reactive sputtering process or a reactive evaporation process includes copper, nickel, chromium, or titanium.

In one embodiment, the low reflection layer is a metal oxide layer or a metal nitride layer, the metal oxide layer or the metal nitride layer is obtained by a reactive sputtering process or a reactive evaporation process, and the metal target materials in the reactive sputtering process or the reactive evaporation process includes copper, nickel, chromium or titanium.

In one embodiment, the upper metal grid layer and the lower metal grid layer are made of copper, and the rough layer is made of nickel copper alloy. The surface roughness of the rough layer is 0.1~1 μm.

In one embodiment, the thickness of the upper adhesive layer and the lower adhesive layer is 1-100 nm.

In one embodiment, the at least two upper adhesive layers and the at least two lower adhesive layers have thickness of 20-40 nm.

In one embodiment, the extinction coefficients of the at least two upper adhesive layers and the at least two lower adhesive layers are less than 3, and reflectivity measured through the foldable glass is less than 30%.

In one embodiment, the reflectivity measured through the foldable glass of the at least two upper adhesive layers and the at least two lower adhesive layers are less than 8%.

In the second aspect, the present application further provides a foldable touch screen, including the above foldable touch screen electrode structure.

In the third aspect, the present application further provides a touch display device, and the touch display device includes the foldable touch screen as described above.

In the technical solution of the present application, the upper metal grid layer is adhered to the first sidewall of the glass substrate by a multi-layer upper adhesive layer, and the lower metal grid layer is adhered to the second sidewall of the glass substrate by a multi-layer lower adhesive layer, thereby providing the metal grid copper layer line with excellent adhesive force on the foldable glass to meet the foldable requirements.

DETAILED DRAWINGS OF THE EMBODIMENTS

In order to more clearly illustrate the embodiments of the present application or the technical solutions in the related art, the following will briefly introduce the drawings that need to be used in the description of the embodiments or the related art. Obviously, the drawings in the following description are only some embodiments of the present application. For those of ordinary skill in the art, without creative labor, other drawings can also be obtained according to the structure shown in these drawings.

Figure 1:
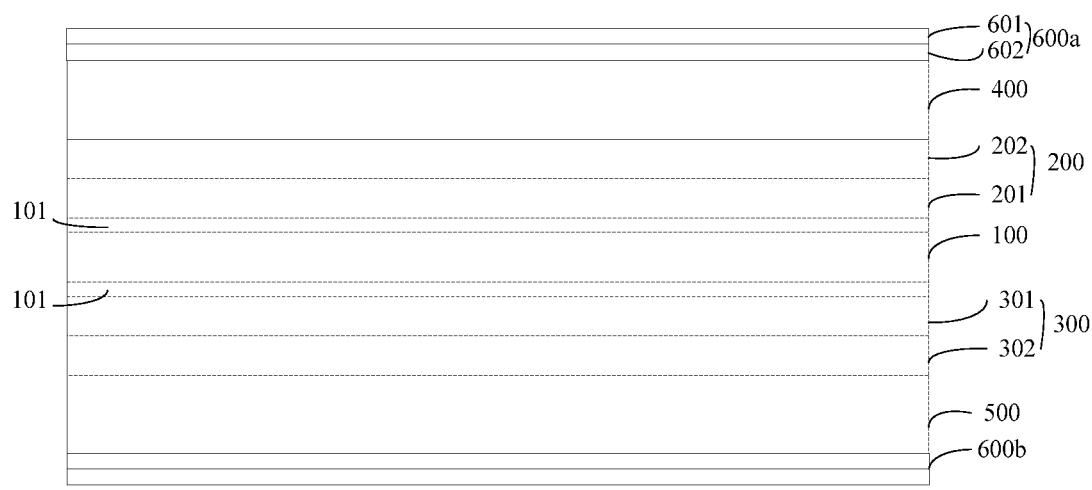
FIG. 1 is a schematic structural view of a foldable touch screen electrode structure according to an embodiment of the present application.

The realization, functional characteristics and advantages of the purpose of the present application will be further described with reference to the drawings in combination with the embodiments.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in the present application, all other embodiments obtained by those skilled in the art without making creative labor belong to the scope of protection of the present application.

It should be noted that all directional indications (such as up, down, left, right, front, back, etc.) in the embodiments of the present application are only used to explain the relative positional relationship, movement conditions, etc. among the components under a specific posture (as shown in the drawings), and if the specific posture changes, the directional indications are also changed accordingly.

In the present application, unless otherwise clearly specified and limited, the terms "connection", "fixed", etc. should be understood in a broad sense. For example, "fixed" can be a fixed connection, a detachable connection, or a whole, or can be a mechanical connection or an electrical connection, or can be directly connected or indirectly connected through an intermediate medium, or can be the internal communication of two elements or the interaction relationship between two elements, unless otherwise clearly defined. For those skilled in the art, the specific meaning of the above-mentioned terms in the present application can be understood according to specific circumstances.

In addition, if there is a description relating to "first", "second", etc. in the embodiments of the present application, the description of "first", "second", etc. is only used for the purpose of description, and cannot be understood as indicating or implying the relative importance thereof or implicitly indicating the number of technical features indicated. Thus, the feature defined with the "first" and "second" may explicitly or implicitly include at least one of the features. In addition, the meaning of "and/or" appearing in the full text includes three parallel schemes, for example, "A and/or B" includes A, or B, or A and B. In addition, the technical solutions of the various embodiments may be combined with each other, but they must be based on those skilled in the art. When the combination of the technical solutions contradicts each other or cannot be realized, it should be considered that the combination of the technical solutions does not exist and is not within the scope of protection required by the present application.

In an embodiment of the present application, a foldable touch screen electrode structure is provided for manufacturing a foldable touch screen. The foldable touch screen electrode structure includes:

a glass substrate 100 including a first sidewall and a second sidewall opposite to each other in a thickness direction of the glass substrate 100, and each of the first sidewall and the second sidewall being provided with an oxide layer 101;

at least two upper adhesive layers 200 and at least two lower adhesive layers 300;

an upper metal grid layer 400 adhered to the first sidewall through the at least two upper adhesive layers 200, and a lower metal grid layer 500 adhered to the second sidewall through the at least two lower adhesive layers 300; and an upper surface layer 600a connected to an upper metal grid layer, and a lower surface layer 600b connected to a lower metal grid layer; each of the upper surface layer 600a and the lower surface layer 600b includes a rough layer 602 and a low reflection layer 601 which are sequentially stacked, and the rough layer 602 is disposed close to the upper metal grid layer 400 or the lower metal grid layer 500.

The glass substrate 100 is a basic component of the touch screen. In the embodiment, the glass substrate 100 is a Flex-Glass. The glass substrate 100 includes a first sidewall and a second sidewall opposite to each other in a thickness direction of the glass substrate 100. The oxide layer 101 on the first sidewall and the second sidewall are obtained by surface treatment using high concentration sodium hydroxide/high concentration potassium hydroxide/hydrofluoric acid or oxygen plasma method for surface micro roughening or increasing oxygen free radicals.

Both the upper metal grid layer 400 and the lower metal grid layer 500 are configured to conduct electricity to play a role of touch driving and sensing. A metal material of the upper metal grid layer 400 and the lower metal grid layer 500 can be copper. The upper metal grid layer 400 is adhered to the first sidewall of the glass substrate 100 through a muti-layer upper adhesive layer 200. The lower metal grid layer 500 is adhered to the second sidewall of the glass substrate 100 through a muti-layer lower adhesive layer 300.

The upper surface layer 600a covers the upper surface of the upper metal grid layer, and the lower surface layer 600b covers the lower surface of the lower metal grid layer. A rough layer 602 is set close to the upper metal grid layer 400 or the lower metal grid layer 500 to reduce intensity of reflected light. A surface of the rough layer 602 further has a low reflection layer 601, which further reduces a reflection effect, to avoid a high reflection of the metal grid from affecting the display effect of the touch display screen. The transmittance of the entire foldable display screen is improved, the brightness of the screen is improved to further improve the display performance of the metal grid touch display screen.

As an embodiment, a material of the rough layer 602 can be nickel-copper alloy. After a layer of nickel-copper alloy is covered on the upper metal grid layer 400 and the lower metal grid layer 500, a chemical method (e.g., ultra-coarsening liquid medicine, sodium hydroxide liquid medicine, or physical method etc.) is applied. A surface treatment (e.g., plasma) is conducted on the surface of nickel-copper alloy for ultra-coarsening treatment, the surface roughness Ra of the upper metal grid layer 400 and the lower metal grid layer 500 is 0.1~1 μm, Ra is 0.6 um ~ 0.9 um.

It is easy to understand that foldable touch screens are always one of development paths of touch screens to achieve foldability. A very important consideration is adhesive strength provided by the adhesive layer material of composite multi-layer materials at the interface, because bending stress will be generated at the interface during folding the touch screen repeatedly. In the field of foldable touch screen, the adhesive force required for folding cannot be achieved if a copper is directly sputtered on the glass to make metal grid touch screen.

In the embodiment, the upper metal grid layer is adhered to the first sidewall of the glass substrate by a multi-layer upper adhesive layer, and the lower metal grid layer is adhered to the second sidewall of the glass substrate by a multi-layer lower adhesive layer, thereby providing the metal grid copper layer line with excellent adhesive force on the foldable glass to meet the foldable requirements.

It is worth mentioning that, in the embodiment, the upper and lower are only used to explain the relative positional relationship among the components in a specific posture (as shown in the drawings). It is not limit that the upper metal grid layer must be above the lower metal grid layer. The upper metal grid layer, the lower metal grid layer, the upper adhesive layer and the lower adhesive layer are interchangeable with each other.

In an embodiment, the at least two upper adhesive layer 200 and the at least two lower adhesive layer 300 are obtained by a reactive sputtering process or a reactive evaporation process, the reactive gas added in the reactive sputtering process or the reactive evaporation process is oxygen and/or nitrogen, and the metal target materials include at least one of copper, nickel, chromium, and titanium. In a direction away from the glass substrate 100, the content of oxide and/or nitride in the at least two upper adhesive layers 200 and the at least two lower adhesive layers 300 gradually decreases, and the metal content thereof gradually increases.

In the embodiment, each adhesive layer in the multi-upper-adhesive-layer 200 and the multi-upper-adhesive-layer 300 is processed on the adhesive layer completed in the glass substrate 100 or in the previous step by the existing reactive sputtering process or a reactive vapor deposition process. The metal target materials used in the process include at least one of copper, nickel, chromium and titanium. The metal target materials may be a copper alloy, a nickel alloy, a chromium alloy or a titanium alloy, or a binary alloy or a ternary alloy of the above four metals. The reactive sputtering process refers to an addition of active gas nitrogen or oxygen into inert argon. When sputtering a metal target material, the metal target material will react with the active gas. When the inert gas is sputtered on the compound target material, the target atoms that obtain kinetic energy will react with oxygen or nitrogen to form compounds, such as nitrides and/or oxides, on the oxide layer 101 or on the adhesive layer completed in the previous step. The adhesive layer adjacent to the oxide in the upper adhesive layer 200 and the lower adhesive layer 300 forms a stable bonding with the oxide on the surface of the glass plate. The reactive evaporation process is to introduce the active gas oxygen or nitrogen into the vacuum chamber, so that oxygen or nitrogen and evaporated metal atoms (e.g., copper, nickel, chromium, and titanium) react to form oxides or nitrides during the deposition process on the surface of the glass substrate 100 of the oxide layer 101.

The grid lines in the upper metal grid layer 400 or the lower metal grid layer 500 are obtained on the corresponding upper adhesive layer 200 or lower adhesive layer 300 by conventional sputtering process or evaporation process or electroplating process. During sputtering or evaporation, the metal oxide or nitride in the upper adhesive layer 200 or the lower adhesive layer 300 forms a stable bonding with the metal in the metal grid layer, such as copper.

In the embodiment, the upper adhesive layer 200 and the lower adhesive layer 300 are both metal oxides or nitrides or a composite compound of the metal oxides or nitrides, which can form a stable bonding with the metal of the corresponding upper metal grid layer 400 or lower metal grid layer 500, and form a stable bonding with the oxide layer 101 on the surface of the glass substrate 100, to provide excellent adhesive force of metal grid copper lines on foldable glass.

In the embodiment, in the direction away from the glass substrate 100, the content of oxide and/or nitride of the at least two upper adhesive layers 200 and the at least two lower adhesive layers 300 gradually becomes smaller, and the metal content gradually becomes larger. That is, the content of the oxide or nitride in the upper adhesive layer 200 or the lower adhesive layer 300 near the glass substrate 100 is higher, which can further form a stable bonding with the oxide of the oxide layer 101 on the glass substrate 100. However, the metal content in the upper adhesive layer 200 or the lower adhesive layer 300 near the metal grid layer is higher, to form a stable bonding with the metal of the metal grid layer. Compared with the single-adhesive-layer, the embodiment can provide more excellent adhesive force of the metal grid copper line on the foldable glass.

In the sputtering or evaporation process, the ratio of metal to oxide, nitride or oxynitride in each layer of the adhesive layer can be controlled by controlling the content of oxygen and nitrogen in the inert argon gas. An amount of oxides and nitrides increases with the increase of the content of oxygen and nitrogen in the inert argon.

Furthermore, the preparation process of the low reflection layer 601 is the same as that of the upper adhesive layer or the lower adhesive layer, which is obtained on the corresponding rough layer 602 by the existing reactive sputtering process or reactive vapor deposition process.

In an embodiment, in order to make the adhesive force of the upper adhesive layer 200 or the lower adhesive layer 300 to the glass substrate 100 and the adhesive force of the upper adhesive layer 200 or the lower adhesive layer 300 to the corresponding upper metal grid layer 400 or lower metal grid layer 500 meet the cross-cut test larger than 5B, an overall thickness of the at least two upper adhesive layers 200 and the at least two lower adhesive layers 300 is 1 nm-100 nm. In the embodiment, the overall thickness of the at least two upper adhesive layers 200 and the at least two lower adhesive layers 300 is 20-40 nm.

In an embodiment, in order to meet the requirement of low reflection of the metal grid layer in the foldable touch screen, the extinction coefficients of the at least two upper adhesive layers 200 and the at least two lower adhesive layers 300 are less than 5, and the reflectivity is measured through the foldable glass less than 40%.

Further, the extinction coefficients of the at least two upper adhesive layers 200 and the at least two lower adhesive layers 300 are less than 3, and the reflectivity measured by the foldable glass is less than 30%.

Further, the reflectivity of the at least two upper adhesive layers 200 and the at least two lower adhesive layers 300 measured through the foldable glass is less than 8%.

The present application further provides a foldable touch screen. The foldable touch screen includes a foldable touch screen electrode structure. For a specific structure of the foldable touch screen electrode structure, reference is made to the above embodiments. Since the foldable touch screen electrode structure adopts all the technical solutions of the above embodiments, it has at least all of the beneficial effects brought by the technical solutions of the above embodiments. The foldable metal grid touch screen provided by the embodiment has very excellent adhesive force of the adhesive layer material, that is, the adhesive force cross-cut test is larger than 5B. In addition, the adhesive layer is a metal oxide or a nitride layer, so that it further has a characteristics of corrosion resistance, blackening and low reflection, and can achieve the effect of non-visible line.

A touch display device includes a foldable touch screen. The specific structure of the foldable touch screen refers to the above embodiments. Since the foldable metal grid touch screen adopts all the technical solutions of the above embodiments, it has at least all the beneficial effects brought by the technical solutions of the above embodiments, which will not be repeated here.

Several specific embodiments are shown below.

In the embodiment, the foldable touch screen electrode structure includes a foldable glass substrate 100 and a metal grid layer. The copper in the metal grid layer is directly obtained on the foldable glass substrate 100 (Flex- Glass) by sputtering process. That is, in a vacuum chamber, inert argon (Ar gas) is used to accelerate the bombardment of the copper alloy target material, so that Cu atoms in the copper alloy target material form a metal grid layer on a surface of the foldable glass substrate 100.

In the embodiment, for the obtained foldable touch screen electrode structure, the adhesive force cross-cut test of the metal grid layer and the foldable glass (Flex-Glass) is less than 5B, the reflectivity from the glass surface is larger than 60%.

According to FIG. 1, the foldable touch screen electrode structure includes an upper surface layer 600*a*, an upper metal grid layer 400, a second upper adhesive layer 202, a first upper adhesive layer 201, a foldable glass substrate 100, a first lower adhesive layer 301, a second lower adhesive layer 302, a lower metal grid layer 500, and a lower surface layer 600*b*. The metal material of the upper metal grid layer 400 and the lower metal grid layer 500 is copper. The metal material of the first upper adhesive layer 201 and the first lower adhesive layer 301 is copper-nickel oxide. The metal material of the second upper adhesive layer 202 and the second lower adhesive layer 302 is copper oxide, and the upper metal grid layer 400 is adhered to the first upper adhesive layer 201 through the second upper adhesive layer 202. The oxide layer of the first sidewall is adhered to the oxide layer of the first sidewall through the first upper adhesive layer 201. The lower metal grid layer 500 is adhered to the first lower adhesive layer 301 through the second lower adhesive layer 302 and then adhered to the oxide layer of the second sidewall through the first lower adhesive layer 301. Both the upper surface layer 600*a* and the lower surface layer 600*b* include a low reflection layer 601 and a rough layer 602 laminated in sequence.

Figure 3:
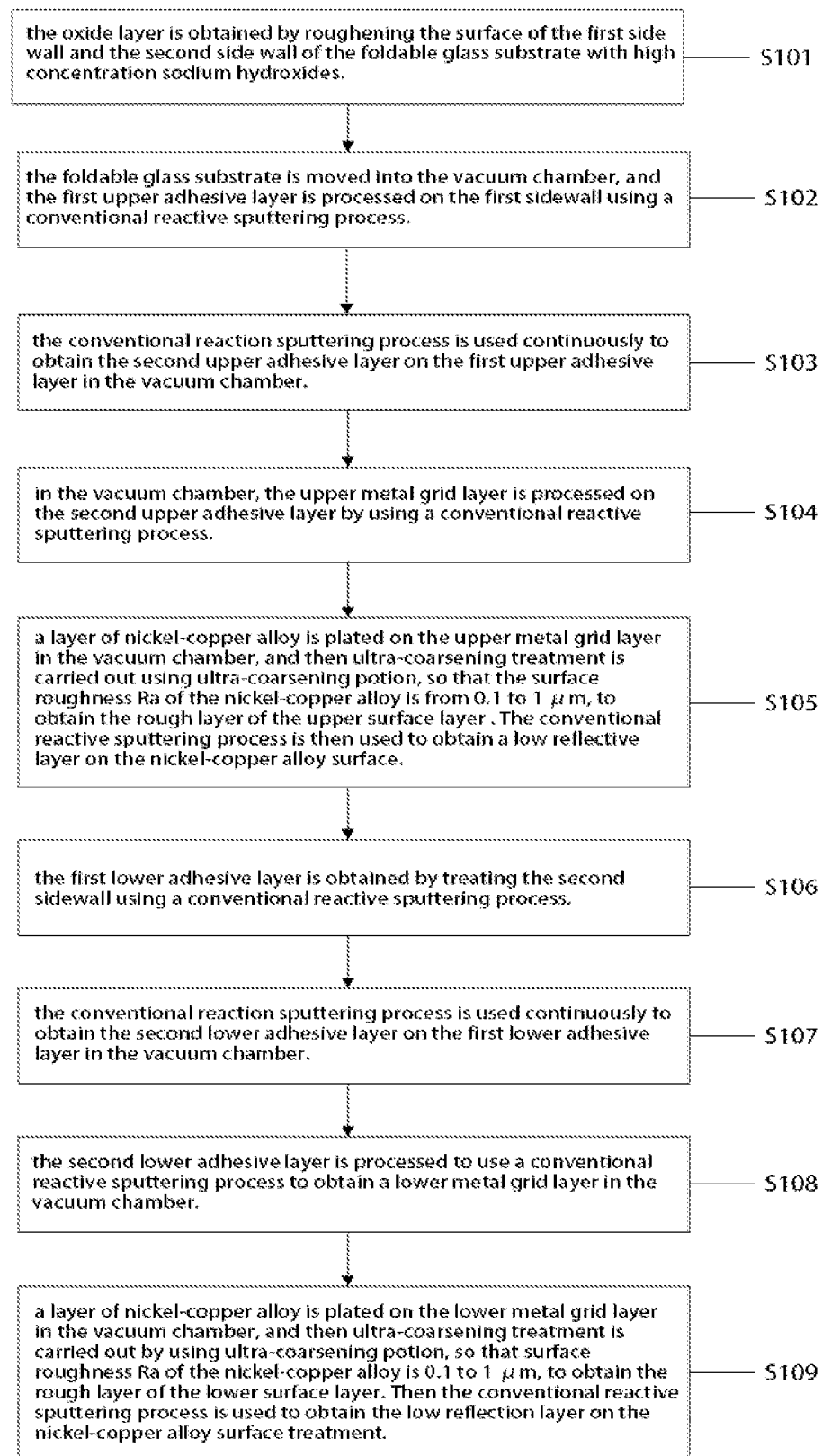
FIG. 3 is a flow chart of steps S101-S109.

As shown in FIG. 3, a preparation process of the foldable touch screen electrode structure is:

Step S101: the oxide layer is obtained by roughening the surface of the first side wall and the second side wall of the foldable glass substrate 100 with high concentration sodium hydroxides.

Step S102: the foldable glass substrate 100 is moved into the vacuum chamber, and the first upper adhesive layer 201 is processed on the first sidewall using a conventional reactive sputtering process. That is to say, inert argon (Ar gas) added with oxygen ($O_2$) is used to accelerate the bombardment of a copper-nickel alloy target, so that Cu and Ni that obtain kinetic energy in the copper-nickel alloy target react with $O_2$ to form copper-nickel oxide on the oxide layer of the first sidewall. The copper nickel oxide forms a stable bonding with the oxide layer on the foldable glass substrate 100. In this process, copper-nickel oxide can be expressed as $CuNiO_{1.5}$ by controlling the content of $O_2$ in Ar gas.

Step S103: the conventional reaction sputtering process is used continuously to obtain the second upper adhesive layer 202 on the first upper adhesive layer 201 in the vacuum chamber. That is, inert argon (Ar gas) added with oxygen ($O_2$) is used to accelerate the bombardment of the copper alloy target, so that Cu, which obtains kinetic energy in the copper alloy target, reacts with $O_2$ to form copper oxide on the first upper adhesive layer 201. In this process, the oxide of copper can be expressed as $CuO_{1.5}$ by controlling the content of $O_2$ in Ar gas.

Step S104: in the vacuum chamber, the upper metal grid layer 400 is processed on the second upper adhesive layer 202 by using a conventional reactive sputtering process. That is, the copper alloy target is accelerated by inert argon (Ar gas), so that the Cu atoms in the copper alloy target material form an upper metal grid layer 400 on the second upper adhesive layer 202. The oxide $CuO_{1.5}$ in the second upper adhesive layer 202 forms a stable bonding with the metal copper.

Step S105: a layer of nickel-copper alloy is plated on the upper metal grid layer 400 in the vacuum chamber, and then ultra-coarsening treatment is carried out using ultra-coarsening potion, so that the surface roughness Ra of the nickel-copper alloy is from 0.1 to 1 μm, to obtain the rough layer 602 of the upper surface layer 600*a*. The conventional reactive sputtering process is then used to obtain a low reflective layer 601 on the nickel-copper alloy surface. That is, inert argon (Ar gas) added with oxygen ($O_2$) is used to accelerate the bombardment of the copper alloy target, so that Cu, which obtains kinetic energy in the copper alloy target, reacts with $O_2$ to form copper oxide on the rough layer 602.

Step S106: the first lower adhesive layer 301 is obtained by treating the second sidewall using a conventional reactive sputtering process. That is, inert argon (Ar gas) added with oxygen ($O_2$) is used to accelerate the bombardment of the copper-nickel alloy target material, Cu and Ni, which obtain kinetic energy in the copper-nickel alloy target, react with $O_2$ to form copper-nickel oxide on the oxide layer of the second sidewall. At this time, the copper nickel oxide forms a stable bonding with the oxide layer on the foldable glass substrate 100. In this process, copper-nickel oxide can be expressed as $CuNiO_{1.5}$ by controlling the content of $O_2$ in Ar gas.

Step S107: the conventional reaction sputtering process is used continuously to obtain the second lower adhesive layer 302 on the first lower adhesive layer 301 in the vacuum chamber. That is, inert argon (Ar gas) added with oxygen ($O_2$) is used to accelerate the bombardment of the copper alloy target, so that Cu, which obtains kinetic energy in the copper alloy target, reacts with $O_2$ to form copper oxide on the first lower adhesive layer 301. In this process, the oxide of copper can be expressed as $CuO_{1.5}$ by controlling the content of $O_2$ in Ar gas.

Step S108: the second lower adhesive layer 302 is processed to use a conventional reactive sputtering process to obtain a lower metal grid layer 500 in the vacuum chamber. That is, the copper alloy target is accelerated by inert argon (Ar gas), so that the Cu atoms in the copper alloy target material form a lower metal grid layer 500 on the second lower adhesive layer 302. The oxide $CuO_{1.5}$ in the second lower adhesive layer 302 forms a stable bonding with the metal copper.

S109: a layer of nickel-copper alloy is plated on the lower metal grid layer 500 in the vacuum chamber, and then ultra-coarsening treatment is carried out by using ultra-coarsening potion, so that surface roughness Ra of the nickel-copper alloy is 0.1 to 1 μm, to obtain the rough layer 602 of the lower surface layer 600*b*. Then the conventional reactive sputtering process is used to obtain the low reflection layer 601 on the nickel-copper alloy surface treatment. That is, inert argon (Ar gas) added with oxygen ($O_2$) is used to accelerate the bombardment of the copper alloy target, so that Cu, which obtains kinetic energy in the copper alloy target, reacts with $O_2$ to form copper oxide on the rough layer 602.

In the foldable touch screen electrode structure obtained in this embodiment, adhesive force cross-cut test of the metal grid layer and the foldable glass (Flex-Glass) is larger than 5B, the reflectivity is 8% tested from the glass surface.

Figure 2:
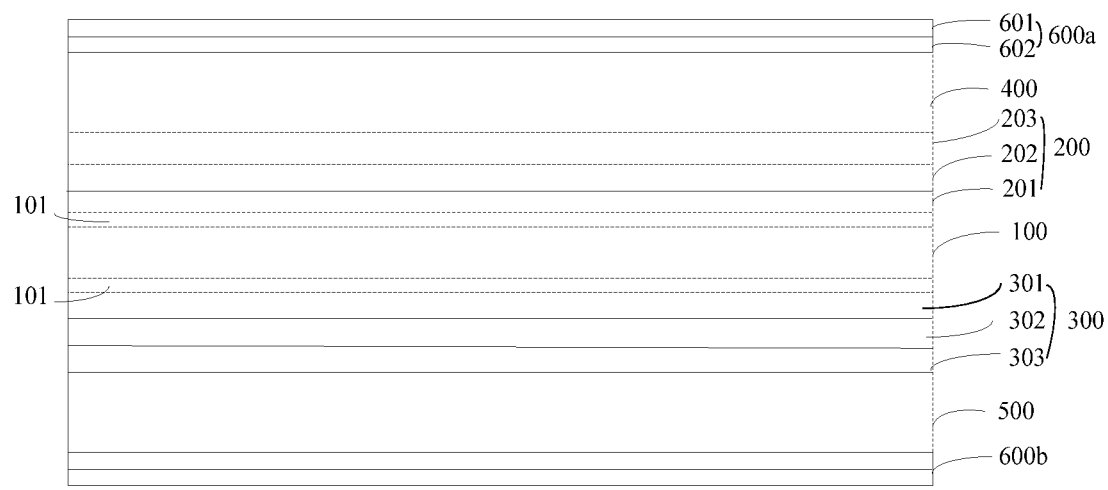
FIG. 2 is a schematic structural view of a foldable touch screen electrode structure according to another embodiment of the present application.

As shown in FIG. 2, the foldable touch screen electrode structure includes an upper surface layer 600*a*, an upper metal grid layer 400, a third upper adhesive layer 203, a second upper adhesive layer 202, a first upper adhesive layer 201, a foldable glass substrate 100, a first lower adhesive layer 301, a second lower adhesive layer 302, a third lower adhesive layer 303, a lower metal grid layer 500, and a lower surface layer 600b. The metal material of the upper metal grid layer 400 and the lower metal grid layer 500 is copper, the metal material of the first upper adhesive layer 201 and the first lower adhesive layer 301 is copper oxides, the metal material of the second upper adhesive layer 202 and the second lower adhesive layer 302 is copper nickel oxides, and the metal material of the third upper adhesive layer 203 and the third lower adhesive layer 303 is copper oxides, the upper metal grid layer 400 is adhered to the second upper adhesive layer 202 through the third upper adhesive layer 203, and then adhered to the first upper adhesive layer 201 through the second upper adhesive layer 202, and then adhered to the oxide layer of the foldable glass substrate 100 through the first upper adhesive layer 201. The lower metal grid layer 500 is adhered under the second lower adhesive layer 302 by the third lower adhesive layer 303, and then adhered under the first lower adhesive layer 301 by the second lower adhesive layer 302, and then adhered under the oxide layer of the foldable glass substrate 100 by the first lower adhesive layer 301. Both the upper surface layer 600a and the lower surface layer 600b include a low reflection layer 601 and a rough layer 602 laminated in sequence.

Figure 4:
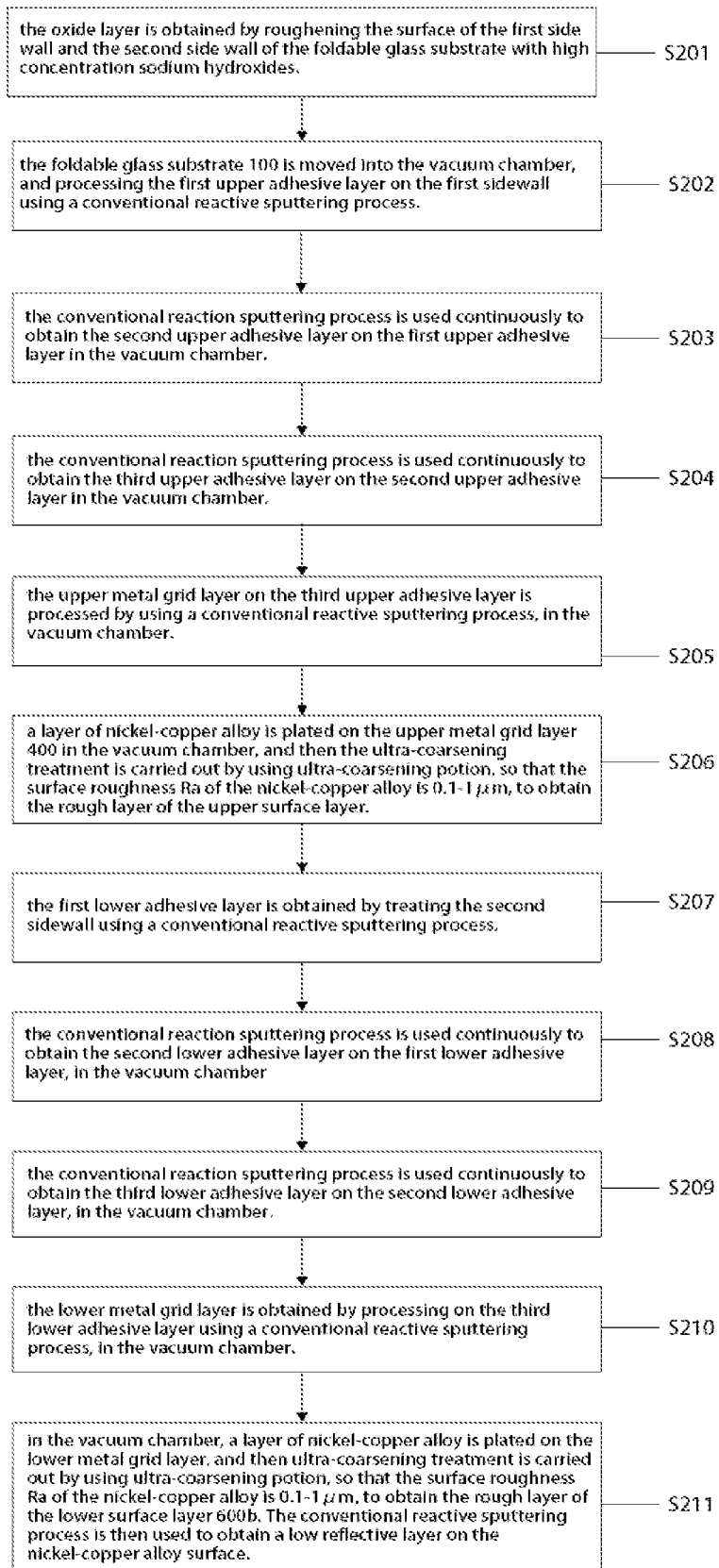
FIG. 4 is a flow chart of steps S201-S211.

As shown in FIG. 4, the preparation process of the foldable touch screen electrode structure is as follows:

S201: the oxide layer is obtained by roughening the surface of the first side wall and the second side wall of the foldable glass substrate 100 with high concentration sodium hydroxides.

S202: the foldable glass substrate 100 is moved into the vacuum chamber, and processing the first upper adhesive layer 201 on the first sidewall using a conventional reactive sputtering process. Inert argon (Ar gas) added with oxygen ($O_2$) is used to accelerate bombardment of a copper alloy target, so that Cu, which obtains kinetic energy in the copper alloy target, reacts with $O_2$ to form copper oxide on the oxide layer of the first sidewall. At this time, the copper oxide forms a stable bonding with the oxide layer on the foldable glass substrate 100. In this process, copper oxide can be expressed as CuO by controlling the content of $O_2$ in Ar gas.

S203: the conventional reaction sputtering process is used continuously to obtain the second upper adhesive layer 202 on the first upper adhesive layer 201 in the vacuum chamber. That is, inert argon (Ar gas) added with oxygen ($O_2$) is used to accelerate the bombardment of the copper alloy target, so that Cu, which obtains kinetic energy in the copper alloy target material, reacts with $O_2$ to form copper oxide on the first upper adhesive layer 201. In this process, the oxide of copper can be expressed as $CuO_{1.25}$ by controlling the content of $O_2$ in Ar gas.

S204: the conventional reaction sputtering process is used continuously to obtain the third upper adhesive layer 203 on the second upper adhesive layer 202 in the vacuum chamber. That is, inert argon (Ar gas) added with oxygen ($O_2$) is used to accelerate the bombardment of the copper alloy target material, so that Cu, which obtains kinetic energy in the copper alloy target, reacts with $O_2$ to form copper oxide on the second upper adhesive layer 202. In this process, the oxide of copper can be expressed as $CuO_{1.5}$ by controlling the content of $O_2$ in Ar gas.

S205: the upper metal grid layer 400 on the third upper adhesive layer 203 is processed by using a conventional reactive sputtering process, in the vacuum chamber. That is, the copper alloy target is accelerated by inert argon (Ar gas), so that the Cu atoms in the copper alloy target form an upper metal grid layer 400 on the third upper adhesive layer 203. The oxide $CuO_{1.5}$ in the third upper adhesive layer 203 forms a stable bonding with the metal copper.

S206: a layer of nickel-copper alloy is plated on the upper metal grid layer 400 in the vacuum chamber, and then the ultra-coarsening treatment is carried out by using ultra-coarsening potion, so that the surface roughness Ra of the nickel-copper alloy is 0.1-1 μm, to obtain the rough layer 602 of the upper surface layer 600a. The conventional reactive sputtering process is then used to obtain a low reflective layer 601 on the nickel-copper alloy surface. That is, inert argon (Ar gas) added with oxygen ($O_2$) is used to accelerate the bombardment of the copper alloy target, so that Cu, which obtains kinetic energy in the copper alloy target, reacts with $O_2$ to form copper oxide on the rough layer 602.

S207: the first lower adhesive layer 301 is obtained by treating the second sidewall using a conventional reactive sputtering process. That is, inert argon (Ar gas) added with oxygen ($O_2$) is used to accelerate the bombardment of the copper alloy target, so that Cu, which obtains kinetic energy in the copper alloy target, reacts with $O_2$ to form copper oxide on the oxide layer of the second sidewall. At this time, the copper oxide forms a stable bonding with the oxide layer on the foldable glass substrate 100. In this process, copper oxide can be expressed as CuO by controlling a content of $O_2$ in Ar gas.

S208: the conventional reaction sputtering process is used continuously to obtain the second lower adhesive layer 302 on the first lower adhesive layer 301, in the vacuum chamber. That is, inert argon (Ar gas) added with oxygen ($O_2$) is used to accelerate the bombardment of the copper alloy target, so that Cu, which obtains kinetic energy in the copper alloy target, reacts with $O_2$ to form copper oxide on the first lower adhesive layer 301. In this process, the oxide of copper can be expressed as $CuO_{1.25}$ by controlling the content of $O_2$ in Ar gas.

S209: the conventional reaction sputtering process is used continuously to obtain the third lower adhesive layer 303 on the second lower adhesive layer 302, in the vacuum chamber. That is, inert argon (Ar gas) added with oxygen ($O_2$) is used to accelerate the bombardment of the copper alloy target, so that Cu, which obtains kinetic energy in the copper alloy target, reacts with $O_2$ to form copper oxide on the second lower adhesive layer 302. In this process, the oxide of copper can be expressed as $CuO_{1.5}$ by controlling the content of $O_2$ in Ar gas.

S210: the lower metal grid layer 500 is obtained by processing on the third lower adhesive layer 303 using a conventional reactive sputtering process, in the vacuum chamber. That is, the copper alloy target is accelerated by inert argon (Ar gas), so that the Cu atoms in the copper alloy target form a lower metal grid layer 500 on the third lower adhesive layer 303. The oxide $CuO_{1.5}$ in the third lower adhesive layer 303 forms a stable bonding with the metal copper.

S211: in the vacuum chamber, a layer of nickel-copper alloy is plated on the lower metal grid layer 500, and then ultra-coarsening treatment is carried out by using ultra-coarsening potion, so that the surface roughness Ra of the nickel-copper alloy is 0.1-1 μm, to obtain the rough layer 602 of the lower surface layer 600b. The conventional reactive sputtering process is then used to obtain a low reflective layer 601 on the nickel-copper alloy surface. That is, inert argon (Ar gas) added with oxygen ($O_2$) is used to accelerate the bombardment of the copper alloy target material, so that Cu, which obtains kinetic energy in the copper alloy target, reacts with $O_2$ to form copper oxide on the rough layer 602, to obtain a low reflection layer 601 of the lower surface layer 600b.

In the electrode structure of the foldable touch screen obtained in this embodiment, the adhesive force cross-cut test of the metal grid layer and the foldable glass (Flex-Glass) is larger than 5B, and the reflectivity tested from the glass surface is 12%.

The above is only an optional embodiment of the present application, and does not limit the scope of the present application. Any equivalent structural transformation made by using the description of the present application and the accompanying drawings under the concept of the application of the present application, or direct/indirect application in other related technical fields are included in the scope of the present application.

The invention claimed is:

1. A foldable touch screen electrode structure, comprising:
   a glass substrate comprising a first sidewall and a second sidewall opposite to each other in a thickness direction of the glass substrate, and each of the first sidewall and the second sidewall being provided with an oxide layer;
   at least two upper adhesive layers and at least two lower adhesive layers;
   an upper metal grid layer adhered to the first sidewall through the at least two upper adhesive layers, and a lower metal grid layer adhered to the second sidewall through the at least two lower adhesive layers; and
   an upper surface layer connected to an upper metal grid layer, and a lower surface layer connected to a lower metal grid layer;
   wherein each of the upper surface layer and the lower surface layer comprises a rough layer and a low reflection layer which are sequentially stacked, and the rough layer is disposed close to the upper metal grid layer or the lower metal grid layer.

2. The foldable touch screen electrode structure of claim 1, wherein the at least two upper adhesive layers and the at least two lower adhesive layers are both metal oxide layers or metal nitride layers, and the metal oxide layers or metal nitride layers are obtained through a reactive sputtering process or a reactive vapor deposition process, metal target materials in the reactive sputtering process or a reactive evaporation process comprise copper, nickel, chromium, or titanium.

3. The foldable touch screen electrode structure of claim 1, wherein the low reflection layer is a metal oxide layer or a metal nitride layer, the metal oxide layer or the metal nitride layer is obtained by a reactive sputtering process or a reactive evaporation process, and metal target materials in the reactive sputtering process or the reactive evaporation process comprise copper, nickel, chromium or titanium.

4. The foldable touch screen electrode structure of claim 1, wherein the upper metal grid layer and the lower metal grid layer are made of copper, the rough layer is made of nickel-copper alloy, and the rough layer has surface roughness of 0.1-1 μm.

5. The foldable touch screen electrode structure of claim 1, wherein the at least two upper adhesive layers and the at least two lower adhesive layers have thickness of 20-40 nm.

6. The foldable touch screen electrode structure of claim 1, wherein extinction coefficients of the at least two upper adhesive layers and the at least two lower adhesive layers are both less than 5, and reflectivity of the at least two upper adhesive layers and the at least two lower adhesive layers measured through the foldable glass is less than 40%.

7. The foldable touch screen electrode structure of claim 6, wherein the extinction coefficients of the at least two upper adhesive layers and the at least two lower adhesive layers are less than 3, and the reflectivity of the at least two upper adhesive layers and the at least two lower adhesive layers measured through the foldable glass is less than 30%.

8. The foldable touch screen electrode structure of claim 7, wherein the reflectivity of the at least two upper adhesive layers and the at least two lower adhesive layers measured through the foldable glass are less than 8%.

9. A foldable touch screen, comprising the foldable touch screen electrode structure of claim 1.

10. A touch display device, comprising the foldable touch screen of claim 9.

* * * * *